United States Patent [19]
Miyamoto

[11] Patent Number: 6,070,862
[45] Date of Patent: Jun. 6, 2000

[54] LIQUID ENCAPSULATED BUSHING HAVING MULTIPLE CHAMBERS

[75] Inventor: Yasuo Miyamoto, Saitama, Japan

[73] Assignee: Honda Giken Kogyo Kabushiki Kaisha, Tokyo, Japan

[21] Appl. No.: 08/877,730

[22] Filed: Jun. 18, 1997

[30] Foreign Application Priority Data

Jun. 18, 1996 [JP] Japan ..................... 8-156462

[51] Int. Cl.⁷ .............. F16F 13/00; B60K 5/12
[52] U.S. Cl. ..................... 267/140.12; 267/220
[58] Field of Search ............... 267/146.12, 219, 267/220

[56] References Cited

U.S. PATENT DOCUMENTS

| | | | |
|---|---|---|---|
| 4,871,152 | 10/1989 | Funahashi | 267/140.12 |
| 4,971,456 | 11/1990 | Hori | 267/140.12 |
| 5,299,788 | 4/1994 | Kanda | 267/140.12 |
| 5,560,593 | 10/1996 | Hofmann et al. | 267/140.12 |

FOREIGN PATENT DOCUMENTS 406074288  3/1994  Japan ............... 267/140.12

Primary Examiner—Matthew C. Graham
Attorney, Agent, or Firm—Arent Fox Kintner; Plotkin & Kahn, PLLC

[57] ABSTRACT

An outer sleeve and an inner sleeve are connected to each other by an elastomeric member. Main liquid chambers and subsidiary liquid chambers, circumferentially connected to the main liquid chambers, are defined between the elastomeric member and the outer sleeve and communicate with each other through orifices. When a large load is input in directions X and X', the volume of the main liquid chambers are decreased, thereby causing the liquid forced out of the main liquid chambers to flow through the orifices, so that a damping force is produced by a resistance, due to a liquid, generated during flowing of the liquid. When a load in directions Z and Z' is input by a load in the directions X and X', the volume of the subsidiary liquid chambers adjoining the main liquid chambers is decreased, thereby causing the liquid, forced out of the subsidiary liquid chambers, to flow through the orifices, thus producing a damping force. Thus, it is possible to effectively damp the load applied in a main load-input direction and the load in a direction perpendicular to the main load-input direction.

8 Claims, 9 Drawing Sheets

LIQUID ENCAPSULATED BUSHING HAVING MULTIPLE CHAMBERS

BACKGROUND OF THE INVENTION

1. Field of the Invention

The present invention relates to a liquid-encapsulated bushing including elastomeric members disposed between outer and inner sleeves having axes parallel to each other. A plurality of liquid chambers are defined to face the elastomeric members and to communicate with one another through orifices, so that the relative movement of the outer and inner sleeves is buffered by a resistance due to a liquid passing through the orifices.

2. Description of the Related Art

FIG. 8 shows a conventional liquid-encapsulated bushing. As can be seen in FIG. 8, the conventional liquid-encapsulated bushing B includes an outer sleeve 01 and an inner sleeve 02 having an axis L. A liquid chamber $R_5$ and a liquid chamber $R_6$ are defined by the outer sleeve 01, first elastomeric member 04 which interconnects a collar 03 fitted over an outer periphery of the inner sleeve 02 and by a pair of second elastomeric members 06 which are coupled to the outer sleeve 01 through spacers 05. The liquid chambers $R_5$ and $R_6$ are connected to each other by two orifices $O_5$.

When the first elastomeric member 04 is deformed by a load to cause the outer and inner sleeves 01 and 02 to be relatively moved in directions of arrows X and X', the volumes of the liquid chambers $R_5$ and $R_6$ are alternately increased and decreased. The liquid in the liquid chambers $R_5$ and $R_6$ flows between the liquid chambers $R_6$ and $R_5$ through the orifices $O_5$. Thus, the load is buffered by a resistance, due to the liquid, generated during the flowing of the liquid. When a further larger load is input to cause the outer and inner sleeves 01 and 02 to be moved largely relative to each other, the first elastomeric member 04 is brought into close contact with one of the second elastomeric members 06, thereby inhibiting the increase in amount of relative movement of the outer and inner sleeves 01 and 02 to exhibit a stopper function.

FIG. 9 is a graph illustrating the characteristic of the amount of relative movement produced between the outer and inner sleeves 01 and 02 of the liquid-encapsulated bushing B provided at the end of the suspension arm, when a tire of a vehicle runs over an uneven road surface. If a load in a direction X, which is a longitudinal direction of the suspension arm, is input, the amount of relative displacement of the outer and inner sleeves 01 and 02 in the direction X is gradually increased (see areas a and b). If the amount of relative displacement in the direction X approaches a limit, the outer and inner sleeves 01 and 02 are displaced relative to each other in a direction Z which is perpendicular to the direction X by a load component which cannot be absorbed (see area c).

The conventional liquid-encapsulated bushing is effective for damping of loads in the directions X and X', but suffers from a problem that loads in the directions Z and Z', perpendicular to the directions X and X', cannot be damped effectively.

SUMMARY OF THE INVENTION

Accordingly, it is an object of the present invention to provide a liquid-encapsulated bushing wherein both the load applied in a main load-input direction and the load in a direction perpendicular to such a main load-input direction can be damped effectively.

To achieve the above object, according to a first aspect and feature of the present invention, there is provided a liquid-encapsulated bushing comprising elastomeric members disposed between outer and inner sleeves having axes parallel to each other. A plurality of liquid chambers are defined to face the elastomeric members and to communicate with one another through orifices, so that the radial relative movement of the outer and inner sleeves is buffered by a resistance due to a liquid passing through the orifices. The liquid-encapsulated bushing includes main liquid chambers whose volume is increased or decreased when a large radial load is input to the outer and inner sleeves. Subsidiary liquid chambers are circumferentially connected to the main liquid chambers and have a volume which increases and decreases when a circumferential load is applied under a large radial load. Orifices permit the main and subsidiary liquid chambers to communicate with each other.

With the above construction, when a large radial load is input to the outer and inner sleeves, the volume of the main liquid chambers is increased or decreased, and the liquid in the main liquid chambers is caused to flow into and out of the subsidiary liquid chambers through the orifices to produce a damping force. When a circumferential load is input by the large radial load, the volume of the subsidiary liquid chambers is caused to flow into and out of the main liquid chambers to produce a damping force. Thus, when the input load cannot be absorbed even if the outer and inner sleeves are displaced relative to each other in one direction to a limit (maximum) position, the remaining load can be absorbed by the relative movement of the outer and inner sleeves in a direction perpendicular to the one direction.

The above and other objects, features and advantages of the invention will become apparent from the following description of the preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

A first embodiment of the present invention will be described first with reference to FIGS. 1 to 5.

Figure 1:
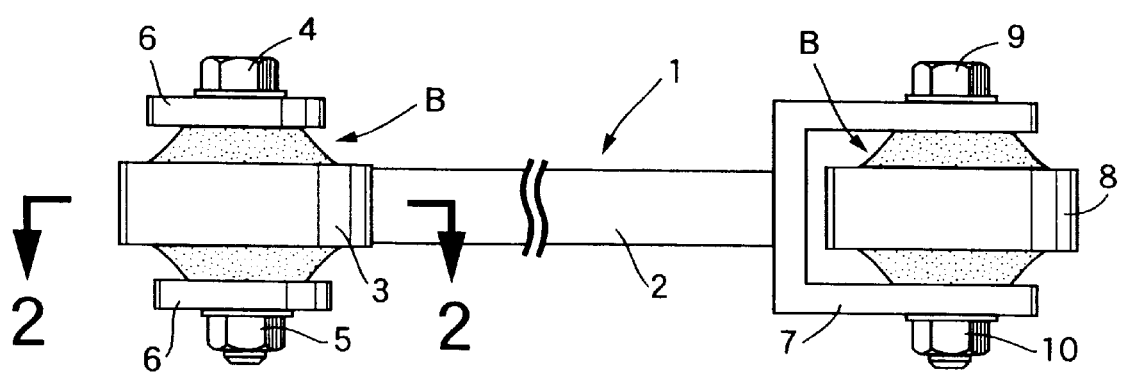
FIG. 1 is a side view of a suspension arm including liquid-encapsulated bushings.

Referring to FIG. 1, there is shown a suspension arm (a leading arm or a trailing arm) 1 of a vehicle. A first liquid-encapsulated bushing B is press-fitted into an annular support portion 3 which is formed at one end of an arm body of the suspension arm 1. The first bushing B is fixed between a pair of mounting brackets 6, 6 which are mounted on a vehicle body by a nut 5 and bolt 4 which is inserted through the bushing B. A U-shaped support portion 7 is formed at the other end of the arm body 2. A second liquid-encapsulated bushing B is press-fitted into an annular support portion 8 which is formed at a tip end of a knuckle arm. The second bushing B is fixed by a nut 10 and a bolt 9 which is inserted into the bushing B. Both first and second liquid-encapsulated bushings B have substantially the same structure. Hence, only the structure of the liquid-encapsulated bushing B fixed to the mounting brackets 6, 6 on the vehicle body will be described.

Figure 2:
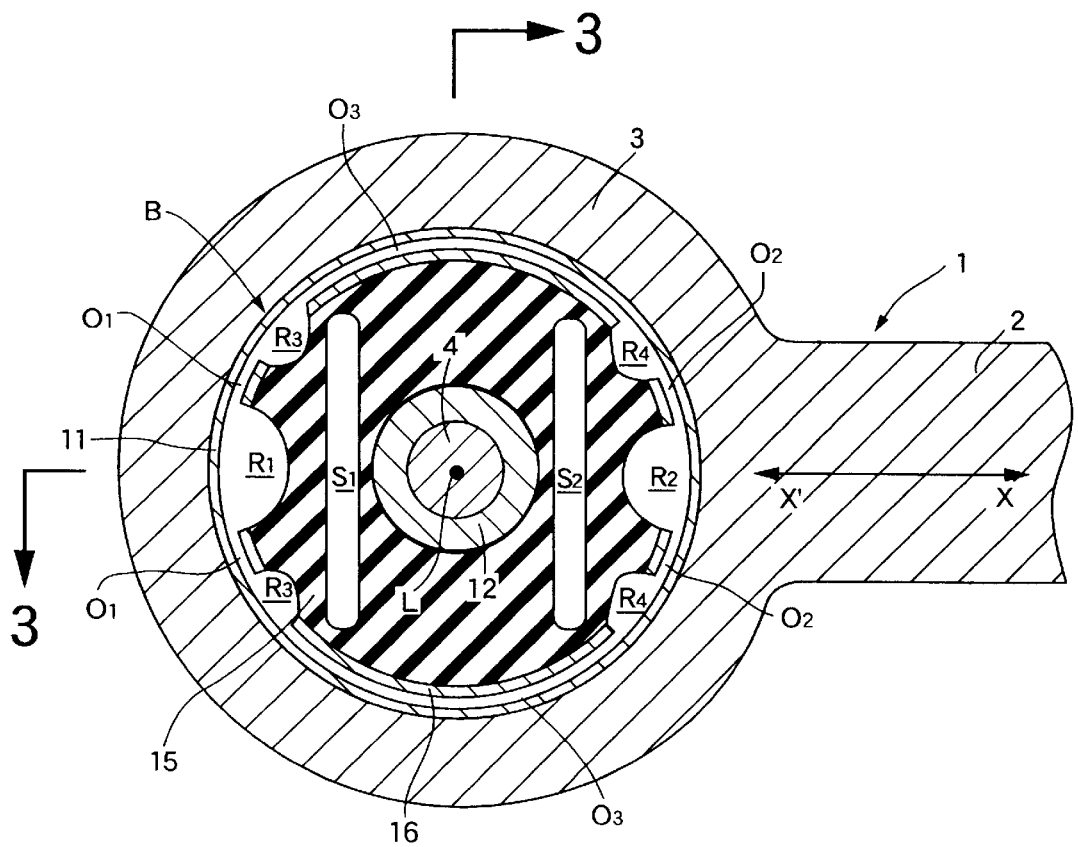
FIG. 2 is an enlarged sectional view taken along a line 2—2 in FIG. 1.
Figure 3:
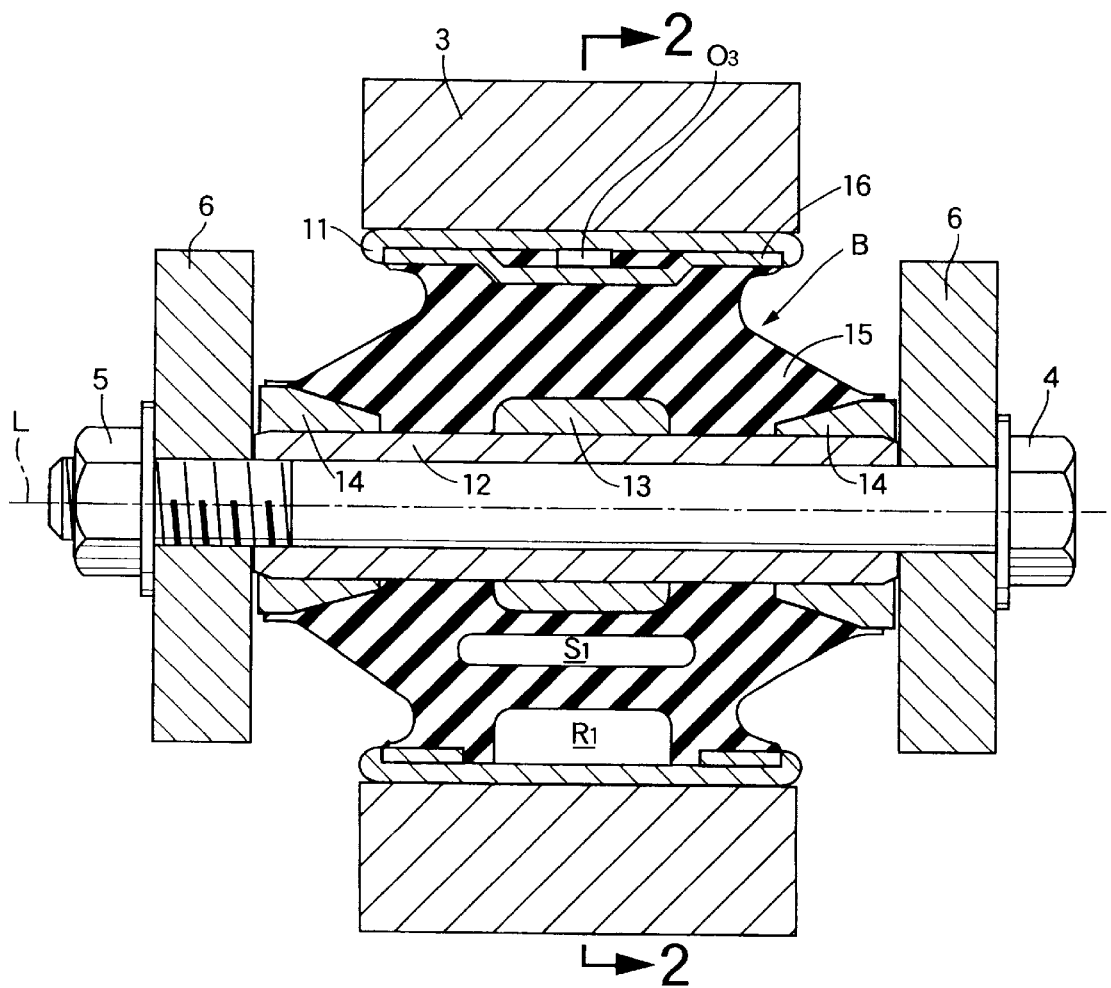
FIG. 3 is a sectional view taken along a line 3—3 in FIG. 2.

As shown in FIGS. 2 and 3, the liquid-encapsulated bushing B includes a larger-diameter outer sleeve 11 and a smaller-diameter inner sleeve 12 which is concentrically disposed within the outer sleeve 11 so that the inner sleeve has a common axis with the outer sleeve 11. A first elastomeric member 15 is fixed by baking to outer peripheries of three inner collars 13, 14 and 14 (see FIG. 3) which are fixed to an outer periphery of the inner sleeve 12 by press-fitting. A substantially annular outer collar 16, which is fixed by baking to an outer periphery of the first elastomeric member 15, is fitted to an inner periphery of the outer sleeve 11 and fixed by caulking.

Loads mainly in directions of arrows X and X' in FIG. 2 are input to the liquid-encapsulated bushing B from the suspension arm 1. A first liquid chamber $R_1$ and a second liquid chamber $R_2$ are defined between an outer periphery of the elastomeric member 15 and an inner periphery of the outer sleeve 11. Two third liquid chambers $R_3$ are defined adjacent and on circumferentially opposite sides of the first liquid chamber $R_1$. Two fourth liquid chambers $R_4$ are defined adjacent and on circumferentially opposite sides of the second liquid chamber $R_2$. The first liquid chamber $R_1$ and the third liquid chambers $R_3$ are interconnected through a pair of first orifices $O_1$. The second liquid chamber $R_2$ and the fourth liquid chambers $R_4$ are interconnected through a pair of second orifices $O_2$. Further, the adjacent third and fourth liquid chambers $R_3$ and $R_4$ are interconnected through a third orifice $O_3$.

The first and second liquid chambers $R_1$ and $R_2$ constitute main liquid chambers according to the present invention, and the third and fourth liquid chambers $R_3$ and $R_4$ constitute subsidiary liquid chambers according to the present invention.

A slit-like first space $S_1$ is defined within the elastomeric member 15 and extends to intervene between a) the first and third liquid chambers $R_1$ and $R_3$ and b) the inner sleeve 12. A slit-like second space $S_2$ is defined within the elastomeric member 15 and extends to intervene between a) the second and fourth liquid chambers $R_2$ and $R_4$ and b) the inner sleeve 12.

The operation of the first embodiment of the present invention having the above-described construction will be described below.

Figure 9:
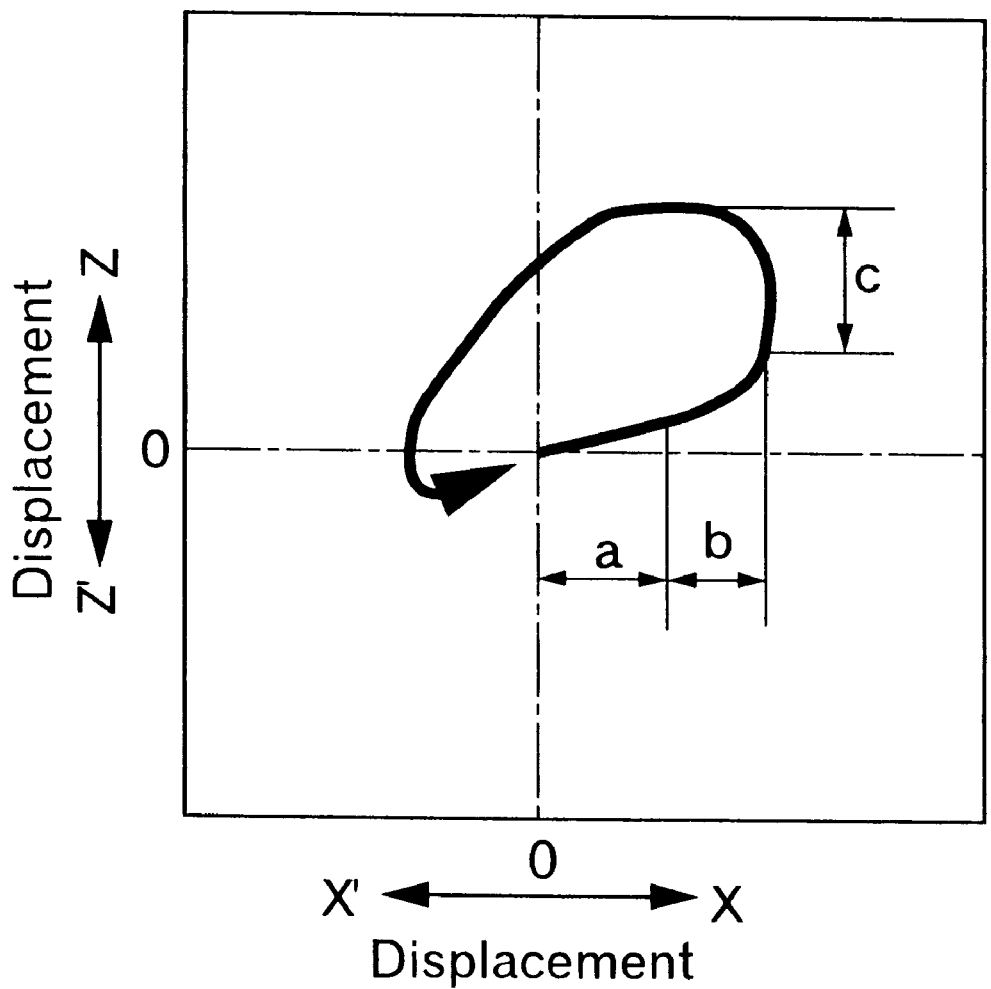
FIG. 9 is a graph illustrating the characteristic of displacement of outer and inner sleeves of the conventional liquid-encapsulated bushing.

A load applied to the liquid-encapsulated bushing B from the suspension arm 1 during traveling of the vehicle is in the area a in FIG. 9. Namely, a relatively small load in the direction of the arrow X in FIG. 2 is applied to the outer sleeve 11 of the liquid-encapsulated bushing B. The elastomeric member 15 is deformed so that the volume of the first space $S_1$ is decreased, while the volume of the second space $S_2$ is increased, thereby producing a damping force. At this time, portions of the elastomeric member 15 located radially outside the first and second spaces $S_1$ and $S_2$ are hardly deformed and hence, the volumes of the first to fourth liquid chambers $R_1$ to $R_4$ are not varied, so that the liquid cannot be passed through the first to third orifices $O_1$ to $O_3$. In this manner, when a relatively small load is applied in the directions of the arrows X and X', the elastomeric member 15 is deformed, so that the volumes of the first and second spaces $S_1$ and $S_2$ are alternately increased and decreased, thereby producing a relatively small damping force corresponding to the input load.

Figure 4:
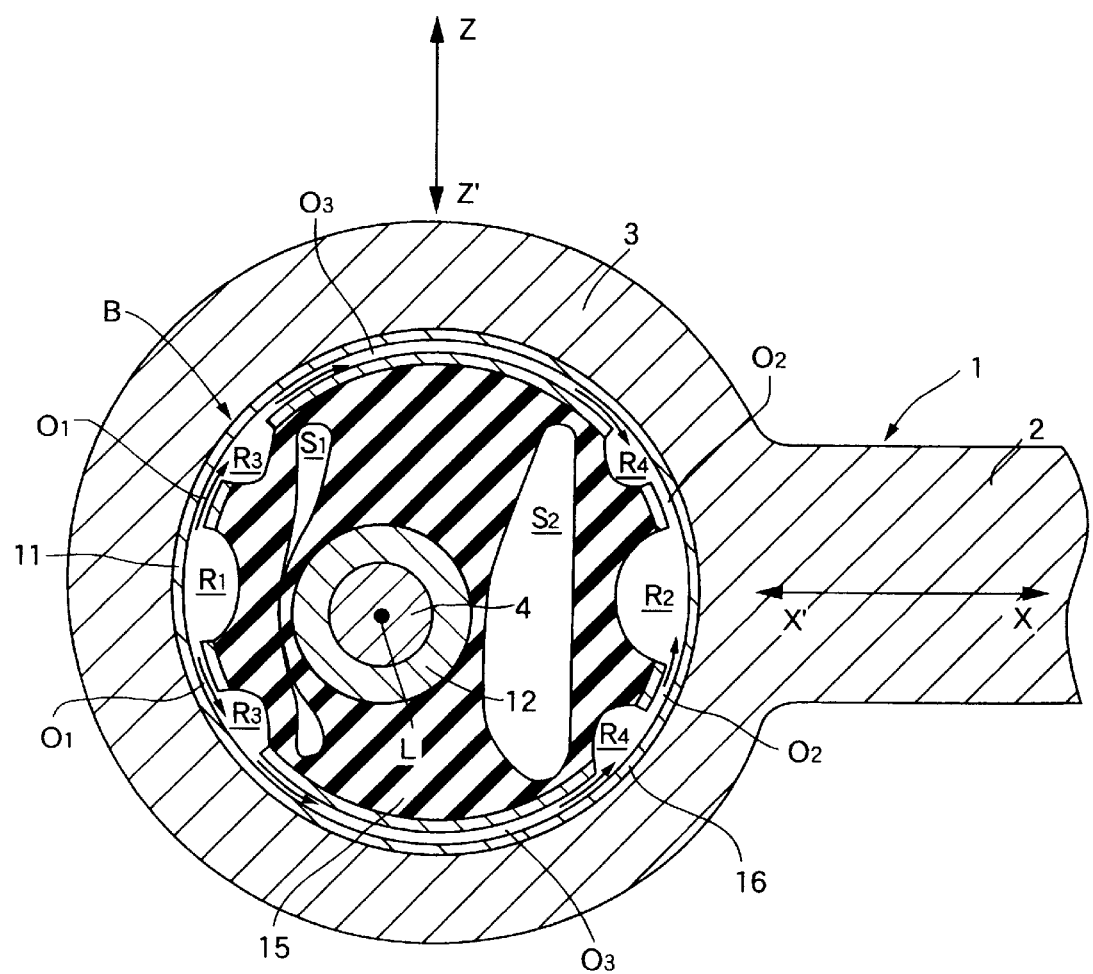
FIG. 4 is a view for explaining the operation when a radial load is input.

When the load applied to the liquid-encapsulated bushing B is increased to reach the area b in FIG. 9, namely, when a relatively large load in the direction of the arrow X is applied to the outer sleeve 11 of the liquid-encapsulated bushing B, a central portion of the first space $S_1$ is crushed as shown in FIG. 4, so that the volume of the first liquid chamber $R_1$, located radially outside the first space $S_1$, is decreased. This causes the liquid in the first liquid chamber $R_1$ to flow through the first orifices $O_1$ into the third liquid chambers $R_3$ and then to flow in a course of the third orifices $O_3$ to the fourth liquid chambers $R_4$ then through the second orifices $O_2$ and into the second liquid chamber $R_2$. During this time, a relatively large damping force, corresponding to the input load, is produced by a resistance due to the liquid passing through the first, second and third orifices $O_1$, $O_2$ and $O_3$.

Figure 5:
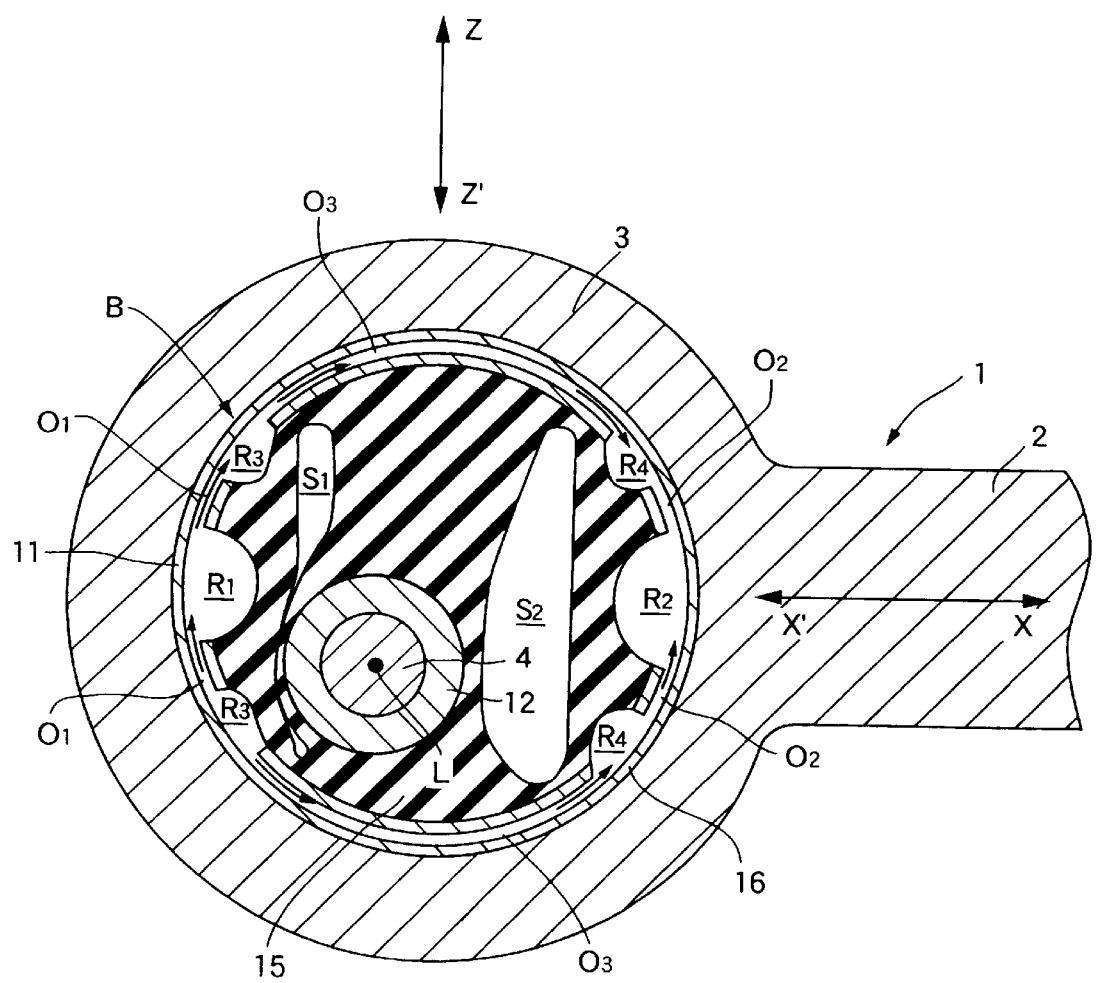
FIG. 5 is a view for explaining the operation when a circumferential load is input.

When the load input to the liquid-encapsulated bushing B is further increased to reach the area c in FIG. 9, namely, when the load in the direction of the arrow Z is applied to the outer sleeve 11 of the liquid-encapsulated bushing B in addition to the load in the direction of the arrow X, the volume of one of the third liquid chambers $R_3$ adjacent the first liquid chamber $R_1$ is decreased as shown in FIG. 5, thereby causing the liquid in the third liquid chamber $R_3$ to flow upwards in FIG. 5 through the first orifice $O_1$ into the first liquid chamber $R_1$ and downwards through the third orifice $O_3$ into the fourth liquid chamber $R_4$. Thus, a damping force corresponding to the load in the direction of the arrow Z is produced by a resistance, due to the liquid, generated during flowing of the liquid.

Thus, even if a load in the directions of Z and Z', which are perpendicular to the directions X and X', in a condition in which a large load has been applied in the directions X and X' which are main load-input directions, the load in the directions of Z and Z' can be damped.

Figure 6:
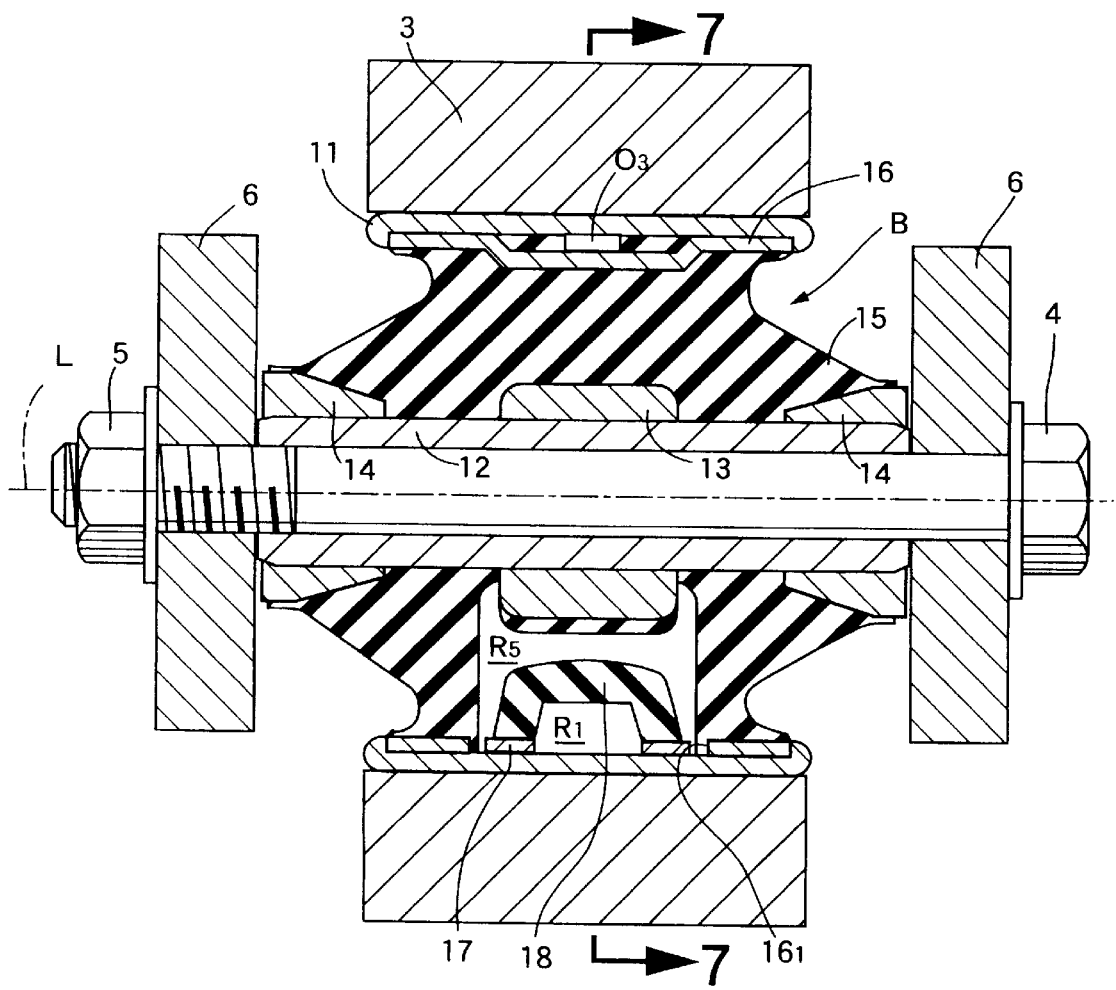
FIG. 6 is a view similar to FIG. 3, but according to a second embodiment of the present invention.
Figure 7:
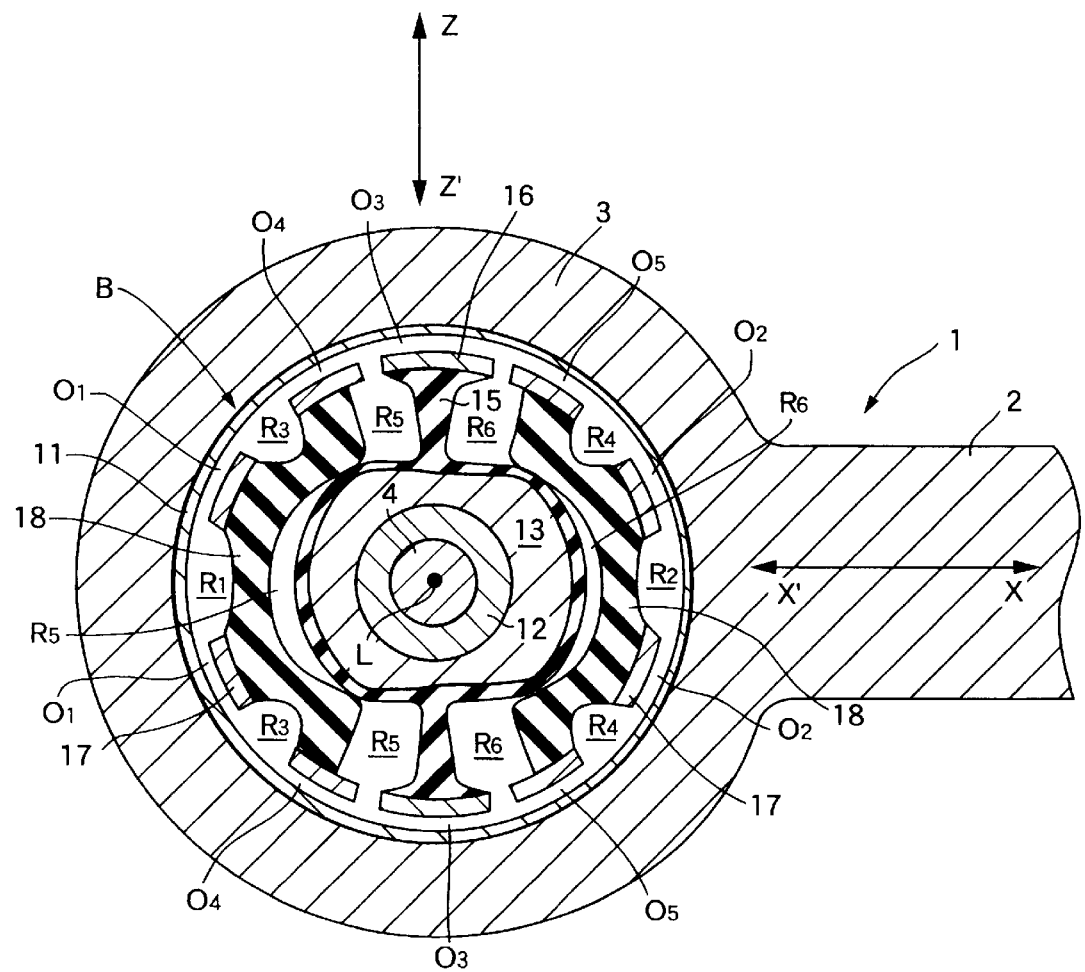
FIG. 7 is a sectional view taken along a line 7—7 in FIG. 6.
Figure 8:
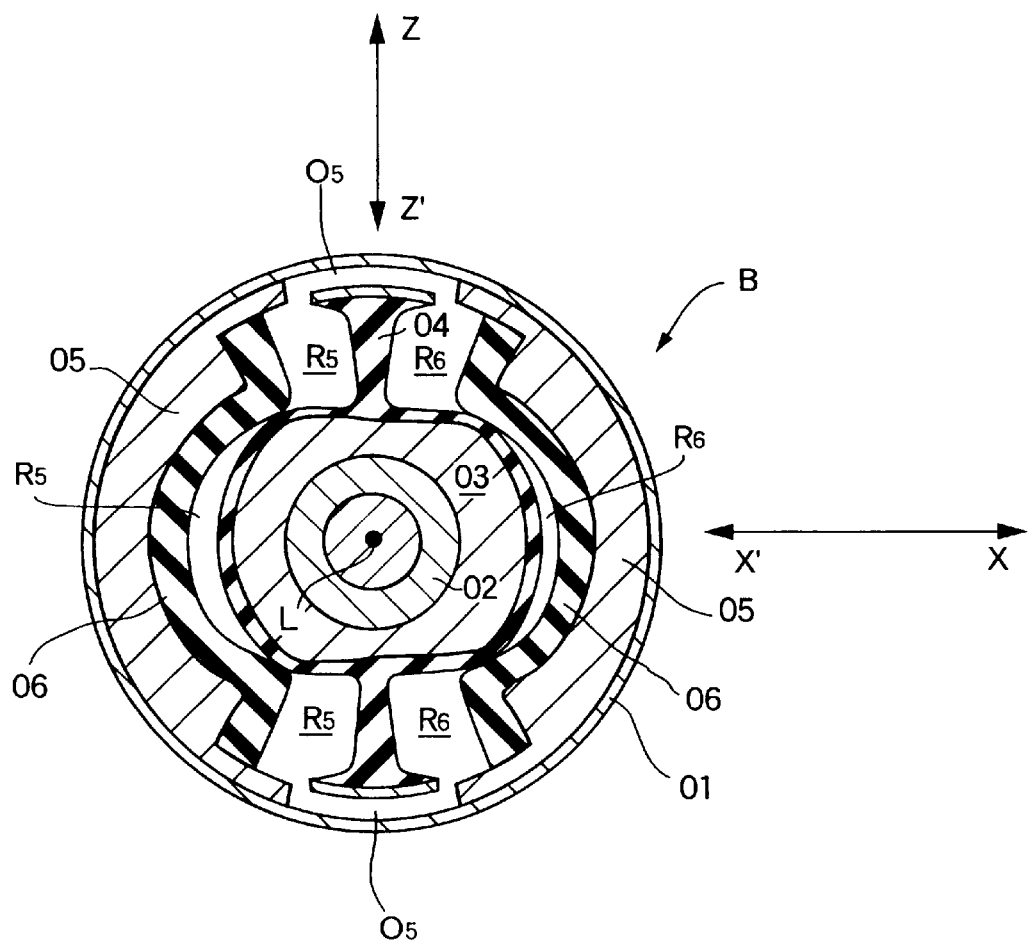
FIG. 8 is a sectional view of a conventional liquid-encapsulated bushing.

A second embodiment of the present invention will now be described with reference to FIGS. 6 and 7, wherein portions or components corresponding to those in the first embodiment are designated by the same reference characters as in the first embodiment.

A liquid-encapsulated bushing B according to the second embodiment includes two second elastomeric members 18 in addition to a first elastomeric member 15 which corresponds to the first elastomeric member 15 in the first embodiment. An outer periphery of the first elastomeric member 15 is fixed, by baking, to an inner periphery of a substantially annular outer collar 16. The collar 16 is fitted and fixed to an outer periphery of the outer sleeve 11 by caulking. A pair of arcuate support plates 17 are fixed, by baking, to outer peripheries of the second elastomeric members 18, so that the support plates 17 are fitted into a pair of circumferentially extending openings $16_1$ (see FIG. 6) defined in the outer collar 16. The first and second elastomeric members 15 and 18 are formed from different materials. The outer and inner sleeves 11 and 12 are concentrically positioned (see FIG. 7) by partial abutment of an outer surface of the first elastomeric member 15 and inner surfaces of the second elastomeric members 18.

A fifth liquid chamber $R_5$ and a sixth liquid chamber $R_6$ are defined between the first elastomeric member 15, the second elastomeric members 18 and the outer sleeve 11. The fifth and sixth liquid chambers $R_5$ and $R_6$ are disposed on opposite sides of the axis L in the directions of the arrows X and X'. The fifth and sixth liquid chambers $R_5$ and $R_6$ communicate with each other through a pair of third orifices $O_3$ defined between the outer sleeve 11 and the outer collar 16.

As in the first embodiment, a first liquid chamber $R_1$ and a second liquid chamber $R_2$ are defined between the pair of elastomeric members 18 and the outer sleeve 11, a pair of third liquid chambers $R_3$ and a pair of fourth liquid chambers $R_4$ are defined adjacent the first and second liquid chambers $R_1$ and $R_2$. The first liquid chamber $R_1$ communicates with the third liquid chambers $R_3$ through first orifices $O_1$, and the third liquid chambers $R_3$ communicate with the fifth liquid chamber $R_5$ through fourth orifices $O_4$. The second liquid chamber $R_2$ communicates with the fourth liquid chambers $R_4$ through second orifices $O_2$, and the fourth liquid chambers $R_4$ communicate with the sixth liquid chamber $R_6$ through fifth orifices $O_5$.

The operation of the second embodiment having the above construction will be described below.

When a relatively small load in the directions of the arrows X and X' is applied to the suspension arm, the volumes of the fifth and sixth liquid chambers $R_5$ and $R_6$ are alternately increased and decreased by deformation of the first elastomeric member 15, thereby causing the liquid in the fifth and sixth liquid chambers $R_5$ and $R_6$ to flow into and out of the sixth and fifth liquid chambers $R_6$ and $R_5$ through the third orifices $O_3$. Thus, a relatively small damping force corresponding to the magnitude of the load input to the liquid-encapsulated bushing B can be provided by a resistance, due to the liquid, generated during flowing of the liquid.

When a large load in the directions of the arrows X or X' is applied to the suspension arm 1, the volume of a central portion of the fifth liquid chamber $R_5$ (or the sixth liquid chamber $R_6$) is eliminated, thereby bringing the outer surface of the first elastomeric member 15 and the inner surface of either one of the second elastomeric members 18 into close contact with each other. Thus, the second elastomeric member 18 is urged and deformed by the first elastomeric member 15. As a result, the volume of the first liquid chamber $R_1$ (or the second liquid chamber $R_2$) is decreased, thereby causing the liquid forced out of the first liquid chamber $R_1$ (or the second liquid chamber $R_2$) to flow through the first orifices $O_1$ (or the second orifices $O_2$) into the third liquid chambers $R_3$ (or the fourth liquid chambers $R_4$). Then, the liquid further flows from the third liquid chambers $R_3$ (or the fourth liquid chambers $R_4$) through the fourth orifices $O_4$ (or the fifth orifices $O_5$) into the fifth liquid chamber $R_5$ (or the sixth liquid chamber $R_6$). Thus, a relatively large damping force corresponding to the input load is produced by a resistance acting on the liquid which is flowing in the above manner.

When the load input to the liquid-encapsulated bushing B is increased to reach the area c in FIG. 9, namely, when a load in the directions of the arrows Z and Z' is applied to the outer sleeve 11 of the liquid-encapsulated bushing B in addition to the load in the direction of the arrow X (or X'), the volume of one of the third liquid chambers $R_3$ adjacent to the first liquid chamber $R_1$ (or one of the fourth liquid chambers $R_4$ adjacent to the second liquid chamber $R_2$) is decreased, thereby causing the liquid in the third liquid chamber $R_3$ (or the fourth liquid chamber $R_4$) to flow through the first and fourth orifices $O_1$ and $O_4$ (or the second and fifth orifices $O_2$ and $O_5$) into the first and fifth liquid chambers $R_1$ and $R_5$ (or the second and sixth liquid chambers $R_2$ and $R_6$). Thus, a damping force corresponding to the load in the directions of the arrows Z and Z' is produced by a resistance due to the liquid generated during flowing of the liquid.

Even in the second embodiment, when a further load is applied in the directions Z and Z' in addition to the load in the directions X and X', the load in the directions Z and Z' can be damped effectively.

Although the number of the first to fourth liquid chambers $R_1$ to $R_4$ is limited in the above embodiments, the number of chambers can be changed. Furthermore, the application of the liquid-encapsulated bushing B according to the present invention is not limited to being supported on a suspension arm of a vehicle.

Although the embodiments of the present invention have been described in details, it will be understood that the present invention is not limited to the above-described embodiments, and various modifications may be made without departing from the spirit and scope of the invention defined in the claims.

What is claimed is:

1. A liquid-encapsulated bushing comprising:
   an outer sleeve;
   an inner sleeve having an axis parallel to an axis of the outer sleeve;
   at least one elastomeric member disposed between said outer and inner sleeves; and
   a plurality of liquid chambers defined to face said at least one elastomeric member and to communicate with one another through orifices, so that a radial relative movement of said outer and inner sleeves is buffered by a resistance due to a liquid passing through said orifices, wherein said plurality of liquid chambers includes a) main liquid chambers whose volume is increased or decreased when a large radial load is input between said outer and inner sleeves, and b) subsidiary liquid chambers which are located on opposite sides of the main liquid chambers and which are circumferentially connected to said main liquid chambers and whose volume is increased and decreased when a circumferential load is applied in addition to the large radial load, and wherein said orifices include orifices which permit said main and subsidiary liquid chambers to communicate with each other, wherein said at least one elastomeric member include spaces defined therein, each said space interposed a) between said inner sleeve and one of the main liquid chambers and b) between said inner sleeve and the subsidiary liquid chambers and wherein the subsidiary liquid chambers are located adjacent opposite ends of each space.

2. The liquid-encapsulated bushing according to claim 1, wherein the subsidiary liquid chambers on the opposite sides of the associated main liquid chamber are each circumferentially distanced about half a right angle from said associated main liquid chamber around the axis of the inner sleeve.

3. A liquid-encapsulated bushing according to claim 1, wherein said main liquid chambers are located between an outer periphery of the at least one elastomeric member and an inner periphery of the outer sleeve.

4. A liquid-encapsulated bushing according to claim 1, wherein said subsidiary liquid chambers are located adjacent and on circumferentially opposite sides of the main liquid chambers.

5. A liquid-encapsulated bushing comprising:

an outer sleeve;

an inner sleeve having an axis parallel to an axis of the outer sleeve;

a first elastomeric member disposed between said outer and inner sleeves and fixed to an outer periphery of said inner sleeve;

second elastomeric members which partially abut said first elastomeric member;

a plurality of liquid chambers defined between said second elastomeric members and said outer sleeve and to communicate with one another through orifices, so that a radial relative movement of said outer and inner sleeves is buffered by a resistance due to a liquid passing through said orifices, wherein said plurality of liquid chambers includes a) main liquid chambers whose volume is increased or decreased when a large radial load is input between said outer and inner sleeves, and b) subsidiary liquid chambers which are located on opposite sides of each main liquid chamber and which are circumferentially connected to said main liquid chambers and whose volume is increased and decreased when a circumferential load is applied in addition to the large radial load; and additional liquid chambers are defined between the first and second elastomeric members, said additional liquid chambers communicated with each other through second orifices and each additional liquid chamber extending to have respective ends located adjacent one of the subsidiary liquid chambers.

6. The liquid-encapsulated bushing according to claim 5, wherein the subsidiary liquid chambers on the opposite sides of the associated main liquid chamber are each circumferentially distanced about half a right angle from said associated main liquid chamber around the axis of the inner sleeve.

7. A liquid-encapsulated bushing according to claim 5, wherein said additional liquid chambers communicate with said subsidiary liquid chambers through third orifices.

8. A liquid-encapsulated bushing according to claim 5, wherein said subsidiary liquid chambers are located adjacent and on circumferentially opposite sides of the main liquid chambers.

* * * * *